United States Patent [19]

O'Driscoll et al.

[11] 3,997,472

[45] Dec. 14, 1976

[54] NOVEL CATALYST SYSTEMS AND METHODS OF PREPARATION

[75] Inventors: Kenneth F. O'Driscoll; Garry L. Rempel, both of Waterloo, Canada

[73] Assignee: Polymeric Enzymes, Inc., Buffalo, N.Y.

[22] Filed: Nov. 11, 1974

[21] Appl. No.: 522,490

[52] U.S. Cl. .............................. 252/430; 252/428; 252/429 R
[51] Int. Cl.² ......................................... B01J 31/02
[58] Field of Search ................ 252/429 R, 428, 430

[56] References Cited

UNITED STATES PATENTS

| | | | |
|---|---|---|---|
| 2,540,599 | 2/1951 | Segura | 252/430 |
| 2,929,792 | 3/1960 | Arnold et al. | 252/430 |
| 3,106,579 | 10/1963 | Hornig et al. | 252/429 R |
| 3,136,731 | 6/1964 | Piechota et al. | 252/429 R |
| 3,346,421 | 10/1967 | Thompson et al. | 252/428 |
| 3,396,123 | 8/1968 | Urban | 252/428 |
| 3,872,026 | 3/1975 | Dunn | 252/429 B |

*Primary Examiner*—Patrick P. Garvin
*Assistant Examiner*—John P. Sheehan
*Attorney, Agent, or Firm*—Sim & McBurney

[57] ABSTRACT

Novel metal catalyst systems are described wherein metal catalysts are evenly distributed in amorphous cross-linked pore-free polymeric gels. The catalysts may be economically and cyclically used in a variety of reactions without loss of catalytic activity.

16 Claims, No Drawings

NOVEL CATALYST SYSTEMS AND METHODS OF PREPARATION

FIELD OF INVENTION

The present invention relates to metal catalysts.

BACKGROUND TO THE INVENTION

Metal catalysts, usually in elemental or organometallic form but sometimes in lower valency form, particularly Group VIA and Group VIII metals, are widely used for a variety of catalytic procedures involving unsaturated compounds, such as hydrocarbons, including hydrogenation, oxidation, carbonylation, hydroformylation, hydration, solvolysis, isomerization and dimerization.

Generally, however, such metal catalysts are difficult to handle and use effectively and present difficulties in achieving economic separation of the used catalyst for reuse, especially when in the form of a soluble metal complex.

Catalysts have been suggested wherein covalent bonding exists between an active metal complex and an insoluble polymer. This procedure often causes a decrease in the activity of the catalyst, which may be a result of the functional groups of the polymer occupying coordination sites of the metal complex. For metal complexes to possess high activity, some degree of coordinative unsaturation must exist, or be easily achieved, in order that substrate activation can occur. Covalent attachment of the complex to a polymer support may limit the degree of coordinative unsaturation appreciably. For example, it has been reported by Z. M. Michalska and D. E. Webster, Platinum Metals Rev., 18, 65 (1974) that the activity of rhodium catalysts covalently attached to polystryrene are only 0.06 times that of an equivalent amount of the homogeneous counterpart.

Furthermore, introduction of the desired functionality to a polymer, that will enable it to covalently bind a catalyst may also cause undesirable functionality to be introduced. The undesired functionality, caused by a side reaction, may depress catalyst activity.

SUMMARY OF INVENTION

In accordance with the present invention, there are provided metal catalysts in a novel physical form, namely, entrapped in cross-linked, amorphous polymeric gels, and methods of gel entrapping of the catalysts. By providing the metal catalysts in this novel form, a readily separable and reusable and easily handled material is provided having a high catalytic activity comparable with the free catalyst.

As used herein, the term "metal" is intended to include elemental metal organo-metallics and metals in a reduced valency form.

GENERAL DESCRIPTION OF INVENTION

The metal catalysts of the invention are one of two types. The first type consists of a colloidal dispersion of metal particles distributed throughout an amorphous crosslinked polymeric gel. The second type consists of a polymeric gel in which catalytically-active species are dissolved in the gel and solvated by functional groups of the polymer.

The polymeric-gel component of the novel catalysts of the present invention are formed from polymerizable monomers and are chemically inert to and incapable of entering into covalent chemical bonding with any of the solvents or components into which the gel is intended to come into contact.

The polymeric-gel components essentially are homogeneous pore-free cross-linked amorphous polymeric materials capable of being swollen by solvents. "Pores" may be considered as long holes, continuous in space and permanent in time, having a cross-section greater than approximately three Angstroms in width. Such structures are absent from the gel component.

In the gel component of the catalyst, there are void spaces between polymeric chains distributed throughout the amorphous gel and the catalyst component is situated in the voids. These voids are transient and their frequency of occurrence is inversely proportional to their size. The upper limit of size is dictated by the extent of cross-linking of the gel and the number of voids decreases as the extent of cross-linking increases.

Where the gel contains a soluble catalyst, solvation of the catalyst by the functional groups of the polymer occurs, so that elution of the catalyst in the swelling solvent on removal of the same is avoided.

The quantity of catalytic material present in the gel is not critical and may vary from about 0.1 to about 10% by weight of the gel.

The novel catalysts of the invention are prepared by preparing a polymeric gel containing a metal compound which itself is incapable of catalytic activity but which can be reduced to a catalytic form, or otherwise may be activated, and thereafter activating the metal compound to the solid metal form or gel-soluble form having catalytic activity, generally by reduction.

The polymeric gel containing soluble metal compound may be formed in accordance with this invention in a number of ways. In one such procedure, a cross-linked, amorphous gel swellable by solvents is formed by any convenient condensation or addition polymerization procedure from one or more polymerizable monomers and one or more cross-linking copolymerizable monomers.

A solution is a solvent capable of swelling the gel of a metal compound from which the catalytically-active metal or gel-soluble form is to be formed then is contacted with the gel, resulting in swelling of the gel and diffusion of the metal compound into the gel. Upon drying, the solvent is removed from the gel while the metal compound remains in the voids of the gel and therefore is entrapped thereby.

A second procedure which may be used in this invention to form the gel containing the metal compound involves inclusion of the metal compound in the components from which the gel is formed upon polymerization. The metal compound is dissolved in the polymerization reaction mixture, possibly along with a solvent for the metal compound. After polymerization to form the gel, the latter solvent, if present, may be removed by drying, leaving the metal compound entrapped in the gel.

The monomers which may be used to form the gels may include a large variety of polymerizable components capable of undergoing condensation or addition polymerization, such as, water soluble monomers, for example, hydroxylated esters of acrylic and methacrylic acid, such as 2-hydroxyethyl methacrylate (HEMA).

Other polymerizable monomers, including maleimide, styrene, vinyl toluene and urethane-forming monomers also may be used.

One or more cross-linking agents in the form of co-polymerizable monomers are included in the gel-forming mixture. The quantity of cross-linking agent used depends on the particular monomers, the cross-linking agent chosen and the degree of cross-linking required in the gel. Usually a quantity of cross-linking agent of about 0.1 to about 5%, based on the weight of monomer, is used.

Typical cross-linking agents which may be used for vinyl-type polymers include methyl methacrylate, diethylene glycol dimethacrylate (DDMA), methyl acrylate, acrylamide, methyl methacrylamide, ethylene glycol dimethacrylate (EDMA), and divinylbenzene.

In some cases, a polymer may be included in the gel-forming reaction mixture to decrease the reaction time required to form the gel or to alter its swelling and solvating properties. Any convenient natural or synthetic polymer, or a mixture of polymers, may be used. Quantities of polymer from 1 to 50%, preferably from about 15 to 25% by weight, of the weight of monomer may be used.

The polymeric material used may be a polymer of the monomer from which the gel is formed or may be a polymer of a different material. Polymers which may be used include poly (2-hydroxyethyl methacrylate) (poly-HEMA), polyvinylpyrrolidone, polyethylenimine, agarose, dextran, albumin, polyacrylamide, polyacrylic acid and polyvinylsulphate.

The gels typically may be formed by first forming a solution of the monomer(s), cross-linking agent(s) and polymer, if required. A free radical initiator is added, in form and quantity depending on the nature of the monomer employed and the reaction temperature to be employed, and polymerization of the reaction mixture under mild conditions in an inert atmosphere to form the gel is carried out.

Any other convenient gel-forming polymerization procedure may be adopted, depending on the materials chosen. For example, the gel may be formed by cross-linking a linear or branched polymer after its polymerization is complete.

Activation of the metal compound to its catalytic form may be carried out by swelling the gel with a solvent containing a reagent for reaction of the metal compound to its catalytic form.

The solvent used for the swelling and containing the reagent may be the same as or different from that dissolving the metal compound in the formation of the gel.

The choice of solvent depends on the ability of the solvent to ensure reaction between the metal compound and the reagent and the size of the reaction product. Thus, if the reaction product is smaller than the metal compound, it is necessary to use a solvent which will prevent difussion of the reaction product out of the gel.

The solvent thereafter may be removed from the gel by drying the same.

Typical solvents which may be used in the formation of the catalysts of the invention include water, methanol, ethanol, dimethylformamide (DMF) and chloroform.

The formation of metal particles in this way, where the catalyst is provided in this form, results in a colloidal dispersion of the metal particles throughout the gel, in which the metal particles have a diameter of about 50 to 300 Angstroms.

From the known chemistry of platinum, palladium and nickel, it would have been expected that such particles would be pyrophoric, while those of ruthenium would be shock sensitive. It was totally unexpected that the products of the invention exhibit no such instabilities.

The invention may be used to provide a wide range of gel-entrapped metallic catalysts, including platinum, palladium, nickel, rhodium, ruthenium and cobalt.

The catalytic gel compositions of the invention may be provided in a variety of physical forms depending on the desired end-use. Thus, the gel compositions may be provided in the form of membranes, coarse or fine powders, shaped articles, or other desired forms.

The gel-entrapped catalysts may be used in such a way that they are readily reusable. Thus, the material or materials to be catalyzed are allowed to permeate the gel, with the assistance of a swelling solvent, if desired. Where such a swelling solvent is used, it usually is chosen so that it does not swell the gel to the extent that it allows the catalyst to diffuse out.

The catalytically-active gels of the invention may be used to conduct any of the reactions for which metallic catalysts are commonly used, as enumerated above. The entrapping of the catalyst in the gel does not diminish significantly the catalytic activity of the metal.

EXAMPLES

The invention is illustrated by the following Examples:

EXAMPLE I

This example illustrates the formation of a gel as a film.

An aqueous solution was prepared containing 80 gms of 2-hydroxyethyl methacrylate (HEMA), 20 gms of polyvinyl pyrrolidone, 0.4% of ethylene glycol dimethacrylate (EDMA) and 0.1% of di(sec-butyl) peroxydicarbonate (Lupersol 225). The solution was cast as a film of thickness 10mls on glass panels, 6 × 11 inches, using a 5 inch Gardener casting knife. Polymerization was carried out in an oven at 40° C under a nitrogen atmosphere for 16 hours. After polymerization the film was released from the glass panel by soaking in water and stored in water until used.

EXAMPLE II

This example illustrates the formation of gels as powders.

a. A mixture of 9.9g of 2-hydroxyethyl methacrylate, 0.4g of ethylene glycol dimethacrylate and 0.015g of di(sec-butyl) peroxydicarbonate was placed in a polymerization tube. The tube and its contents were purged with nitrogen gas. The tube was sealed and was heated at 50° C for 72 hours to an essentially complete conversion of monomer to polymer. The procedure was repeated using an equivalent quantity of methyl methacrylate.

b. A mixture of 9.8ccs of vinyl toluene, 0.2ccs (55 to 60% "active") of divinyl benzene and 94mg of benzoyl peroxide was polymerized in the manner described in (a) using a heating schedule of 80° C for 24 hours followed by 100° C for 48 hours. The experiment was repeated using an equivalent amount of styrene.

After polymerization was complete, the hard polymers were mechanically crushed to powder form.

EXAMPLE III

This example illustrates the incorporation of palladium ions into a poly (HEMA) gel.

A solution of 0.1M ethanolic $Li_2Pd\ Cl_4$ was prepared by stirring a mixture of 0.18 g of $Pd\ Cl_2$, 0.01 g of Li Cl and 10 ml of absolute alcohol overnight resulting in the formation of a clear reddish-brown solution. 2.84 g of poly (HEMA) gel particles of irregular shape approximately 1 to 5 mm in size and formed by the process of Example II, were placed in the solution and left in contact therewith for 5 days. At the end of this period, the swollen gel particles which had assumed the colour of the solution, were removed from the solution and washed with absolute alcohol.

The washed gel particles then were placed in a vacuum oven for three days to ensure complete removal of solvent. The dried particles retained the distinctive colour of the $Li_2Pd\ Cl_4$ and were visually clear, indicating the substantial absence of aggregation of the metal complex. On the basis of an equilibrium swelling value of 1 ml solution per g of dry gel and no selective partitioning of $Li_2Pd\ Cl_4$ between the gel and solvent phases, the concentration of palladium in the gel was determined to be 11 mg Pd per g of gel.

EXAMPLE IV

This example illustrates the incorporation of platinum ions into poly (HEMA) gel discs.

A solution of chloroplatinic acid was prepared by dissolving 0.27 g of chloroplatinic acid hexahydrate (40% Pt) in 9.75 g of distilled water. Thin discs of poly (HEMA), prepared by slicing the hard polymer obtained in Example II into discs of approximately 0.1cm thick × 1cm diameter, and weighing a total of 3.89g, were placed in this solution for a period 5 days. At the end of this period, the swollen discs were removed, washed with water, surface-dried with absorbent paper and weighed. The swollen discs were found to weigh 5.81g. The discs were then dried in a vacuum oven. Based on the weight of imbibed solution and assuming equal partitioning of $H_2Pt\ Cl_6$ between gel and solution phases, the concentration of platinum in the gel was 5.5mg Pt per g of gel.

EXAMPLE V

This example illustrates the incorporation of additional species into polymer gels.

Following the techniques of Example III a number of metal compounds were incorporated into polymer gels, prepared as outlined in Example II, in each case using 0.1M solution of the metal ion in a suitable solvent.

In each case, after the solvent had been removed from the gels, the polymer possessed the characteristic colour of the entrapped metal complex and remained visually clear, indicating the absence of extensive aggregation of metal compound.

The following Table I shows the metal complexes, solvents and polymer used:

TABLE I

| Metal Compound | Polymer | Solvent |
| --- | --- | --- |
| $Ru\ Cl_3\ .\ xH_2O$ | Poly(HEMA) | MeOH |
| $Ru_3(Acetate)_7O$ | " | MeOH |
| $Ni(Acetate)_24H_2O$ | " | MeOH |
| $Rh\ Cl_3\ .\ 3H_2O$ | " | MeOH;EtOH |
| $Co\ Cl_2\ .\ 6H_2O$ | " | MeOH |
| (Cyclooctadiene $Rh\ Cl)_2$ | Poly(vinyl) toluene) | $CHCl_3$ |
| $Rh\ Cl(P\ .\ Ph_3)_3$ | Poly(HEMA) | DMF |
| $Ru\ Cl_2(P\ .\ Ph_3)_3$ | " | DMF |
| $Ru_3(Acetate)_7O$ $(P^3\ .\ Ph_3)_3$ | " | EtOH |

TABLE I-continued

| Metal Compound | Polymer | Solvent |
| --- | --- | --- |
| (Ph. = phenyl) | | |

EXAMPLE VI

This example illustrates activation of palladium-containing gel particles.

About 0.5g of dry $Li_2Pd\ Cl_4$/poly(HEMA) gel particles prepared as outlined in Example III and in the form of roughly rectangularly-shaped elements measuring 2 4mm per side were added to 50mls of 1M aqueous $NaBH_4$ solution. A vigorous reaction took place with the surface of the gel particles turning black within 10 to 15 seconds. After twelve hours no further reaction was observed, the solution was clear and there was no evidence of metal formation outside the gel phase.

The gel particles then were placed in a large volume of water for 12 hours, followed by immersion for twelve hours in methyl alcohol.

Inspection of thin sections of the swollen gel particles indicated that reduction to the metal had occured throughout the interior of the gel. After drying under vacuum overnight, the gel was crushed to a powder.

EXAMPLE VII

This example illustrates the activation of platinum-containing gel particles.

About 0.4g of dry $H_2Pt\ Cl_6$/poly(HEMA) gel particles prepared as described in Example IV and in the form of approximately rectangularly-shaped elements measure 2 to 4mm per side were added to 50mls of 1M aqueous $NaBH_4$ solution. A vigorous reaction took place and the surface of the gel particles turned black within seconds. After twelve hours no further reaction was observed and there was no evidence of metal formation outside the gel particles. The gel particles then were placed in water for twelve hours followed by soaking in methanol for 24 hours.

Visual inspection of thin sections of gel particles indicated that reduction to the metal had occurred throughout the interior of the gel. After drying under vacuum, the gel was crushed to a powder.

EXAMPLE VIII

This example illustrates the preparation and activation of a platinum-containing gel film.

A circular piece of water-swollen film prepared as outlined in Example I and measuring 4 inches in diameter and 10mls in thickness was placed in 80mls of 2.5wt.% $H_2Pt\ Cl_6$ in 0.2N HCl solution for 24 hours.

A separate stabilized 0.1M solution of $NaBH_4$ was prepared by the addition of 3.95g of the hydride to 1 liter of 95%EtOH containing 0.37g NaOH. The solution was filtered to remove small amounts of insoluble material.

The gel film was carefully removed from the platinic acid solution and shaken to remove most of the surface solution. The remainder of the surface solution was removed by quickly dipping the film into an ethanol bath before immersion in the $NaBH_4$ solution. Upon immersion in the $NaBH_4$ bath, the film gradually darkened over a period of 30 minutes. After standing in the $NaBH_4$ solution a further 30 minutes, the film was removed and placed in a large volume of distilled water, which was changed frequently to ensure complete removal of reaction by-products. The film was kept under water until used.

The particle size of the platinum particles in the film was measured by x-ray line broadening and was found to be 100±50 Angstroms. This measurement was confirmed by Scanning Electron Microscopy.

EXAMPLE IX

This example illustrates the preparation and activation of palladium-containing gel particles.

4.08g of poly(HEMA) gel particles prepared as described in Example II were added to a solution of 0.185g of $PdCl_2$ and 0.098g of LiCl dissolved in 15ml of water and left to equilibrate for 3 days. Thereafter, the gel particles were washed with water and methanol and dried under vacuum.

Based on the assumption of an equilibrium swelling value of 0.7ml/g of dry gel, the palladium concentration of the gel is 5mg Pd per g of gel.

Activation of 2.05g of these gel particles was accomplished by placing them in 100ml of aqueous $NaBH_4$ for 1 day. The gel particles were washed by placing them in 500ml of water for 1 day followed by immersion in 500mls of methanol for 24 hours. The washed particles were dried in air at room temperature.

EXAMPLE X

This example illustrates activation of ruthenium-containing gel particles.

About 0.78g of $Ru_3Ac_7O$/poly(HEMA) gel particles formed as described in Example V were placed in a solution of 2.02g of $NaBH_4$ in DMF and the mixture was allowed to stand for approximately 24 hours. At the end of this period the solution had taken on a light-known colour.

The gel particles were placed in a large volume of methanol which turned light green due to eluting of residual $Ru_3Ac_7O$ from the gel. The methanol was replaced by fresh methanol until the solution remained clear. The resultant gel particles were brownish-black in colour. Immersion of the particles in DMF did not result in leaching of material from the gel.

EXAMPLE XI

This example illustrates the activation of nickel-containing gel particles.

1.06g of Ni(acetate)$_2$·4H$_2$O/poly(HEMA) gel particles prepared as described in Example V were added to an 0.5M solution of $NaBH_4$ in DMF. A vigorous reaction took place over a period of 6 hours at the end of which time, black gel particles were removed from the reaction mixture and placed in 500ml of methanol to wash out reaction by-products from the gel particles. The particles thereafter were vacuum dried.

EXAMPLE XII

This example illustrates the activation of rhodium-containing gel particles.

2.6g of (cyclooctadiene RhCl)$_2$/poly(vinyl toluene) gel particles, prepared as described in Example V, were placed in a flask containing a solution of 10ml methanol and 40ml chloroform. Hydrogen was bubbled through the mixture with stirring for 6 hours. The gel particles were removed by filtration and washed with chloroform. The gel particles were placed in 100mls of chloroform for 24 hours after which time the chloroform was removed from the particles by evaporation at atmospheric pressure.

EXAMPLE XIII

This example illustrates the preparation and activation of palladium containing gel particles.

A hydrophillic polyurethane was crushed to small particles. 0.3g of it was allowed to swell for 48 hours in a tightly stoppered flash containing 10 ml of 0.1M ethanolic Li$_2$ Pd Cl$_4$. After washing the swollen particles with ethanol they were dried in vacuo at room temperature for 24 hours.

The polyurethane particles were added to 50ml of 1M ethanolic $NaBH_4$. The particles turned black within a few minutes. After 4 hours, the particles were removed from the $NaBH_4$ solution, washed in water and allowed to dry in air. These particles were found to be active as a catalyst for decomposition of $H_2O_2$ as determined by observing the rapid evolution of bubbles when the particles were placed in a 3% aqueous solution of $H_2O_2$.

EXAMPLE XIV

This example illustrates the formation of gel-entrapped metal complexes by a procedure alternate to that illustrated in Examples I to V.

A series of reactions was carried out in which aqueous reaction media containing polymerizable monomers, cross-linking agents, initiators, polymers and dissolved quantities of Rh$_2$(Acetate)$_4$, were polymerized to form a gel having the Rh$_2$Ac$_4$ entrapped therein. The gels were subsequently activated by protonation with a solution of HBF$_4$ in n-propanol under nitrogen to form a gel-entrapped catalyst in which the catalyst may be represented by Rh$_2$(Acetate)$_{4-m}$$^{m+}$, where $m$ is 1, 2, 3, or 4. After the activation, the gels were washed with ethanol and water prior to vacuum drying.

The following Table II gives the proportions of reactants and reaction conditions used to form the gels:

TABLE II

| Quantity of Rh$_2$Ac$_4$ (mg) | Reaction Mixture[1] | | | | | | | Condition | | |
|---|---|---|---|---|---|---|---|---|---|---|
| | H$_2$O | EtOH | HEMA mls | EDMA | STY | POLY-HEMA g | PVP g | INIT ml | Time hrs. | Temp. °C. |
| (a) 22.8 | 5 | — | 12.5 | 0.8 | — | 1.49 | — | 3 | 17 | 30 |
| (b) 170 | 5 | — | 12.5 | 0.8 | — | 0.93 | 0.52 | 2.5 | 3 | 30 |
| (c) 300 | 1 | 4 | 5 | 0.3 | 2 | 0.4 | — | 1 | 12 | 30 |

Notes: (1)
HEMA = 2-hydroxyethyl methacrylate
EDMA = ethylene glycol dimethacrylate
STY = styrene
PVP = polyvinyl pyrrolidone
INIT = polymerization initiator - the initiator used in each case was a 1% solution of di(sec-butyl)peroxydicarbonate in methanol The following Table III indicates the quantities or reagent and conditions used in the protonation and drying of the gels (a), (b), and (c) of Table II:

TABLE III

| Quantity of gel (g) | Protonation 50% HBF$_4$ | Solution n-propanol (mls) | Protonation Time hrs. | Conditions Temp. °C. | Drying Time hrs. | Conditions Temp. °C. |
| --- | --- | --- | --- | --- | --- | --- |
| (a) 1.0 | 0.12 | 2.5 | 5 | 65 | 15 | 70 |
| (b) 1.0 | 0.5 | 50 | 20 | 75 | 18 | 60 |
| (c) 0.6 | 0.5 | 30 | 12 | 75 | 30 | 60 |

EXAMPLE XV

This example illustrates the use of activated gels as hydrogenation catalysts.

A series of experiments was performed in which 5ml of an 0.1M solution of an olefin in n-propanol was reacted with hydrogen at 70cm pressure and 30° C in the presence of activated gel particles. The rates of hydrogen uptake, i.e. the rate of hydrogenation of the olefin, were monitored and compared with those for a commercial palladium on carbon catalyst.

The results are reproduced in the following Table IV:

| Olefin | Catalyst | wt. mgm/l | wt. of metal mgm/l | Initial Rate of Hydrogenation (M/sec) × 10$^6$ |
| --- | --- | --- | --- | --- |
| Decene-1 | 5% Pd/C | 11.5 | 0.55 | 97.2 |
| Decene-1 | Pd gel Ex.VI | 21.2 | 0.23 | 29.2 |
| Decene-1 | Pt gel Ex.VII | 23.2 | 0.13 | 2.6 |
| Trans 3-hexene | Pd gel Ex.VI | 21.6 | 0.23 | 23.6 |
| Hexene-1 | Pd gel Ex.VI | 18.2 | 0.20 | 22.2 |
| Decene-1 [1] | RuAc gel Ex.X | 73.4 | 1.3 | 1.1 |

Note: (1) in DMF at 50° C rather than in n-propanol at 30° C

The results of the above Table IV indicate that the metals in the gel are about as active as the commercial Pd/C catalyst and hence entrapment of the catalyst in the gel does not decrease the catalytic activity of the metal.

EXAMPLE XVI

This example illustrates the use of activated gel as hydrogenation and isomerization catalysts.

Gels (a), (b), and (c) prepared as described in Example XIV were used as hydrogenation and isomerization catalysts on decene-1 in n-propanol at 75° C. The hydrogen consumption was measured over the reaction period and the product distribution, (i.e., the quantity of alkane, isomeric decene and unconverted decene-1) was determined. The results are reproduced in the following Table V:

TABLE V

| Gel I.D. | wt. (mg) | Quantity Decene-1 (ml) | H$_2$ Consumption (M/sec) × 10$^5$ | Run Time (hrs) | Product Distribution 1-ene/ane/iso % |
| --- | --- | --- | --- | --- | --- |
| Ex. XIV (b) | 22 | 1.0 | 1 | 12 | 65/30/5 |
| Ex. XIV (b) | 39 | 1.0 | 3 | 10 | 70/25/5 |
| Ex. XIV (c) | 30 | 1.0 | 5 | 4 | 0/80/20 |
| Ex. XIV (c) | 38 | 1.0 | 5 | 3 | 0/85/15 |
| Ex. XIV (c) | 3 | 0.1 | 5 | 1.5 | 0/85/15 |
| Ex. XIV (c)[1] | 7.6 | 0.1 | 5 | 3 | 5/75/20 |
| Ex. XIV (c) | 2.8 | 2.0[2] | 3 | 15 | 70/20/10 |
| Ex. XIV (c) | 7.4 | 0.1 | 5 | 1.5 | 0/80/20 |
| Ex. XIV (b) | 48 | 0.1 | 3 | 6 | 5/75/20 |
| Ex. XIV (a) | 43 | 0.1 | 0.1 | 12 | 90/7.5/2.5 |
| Ex. XIV (a) | & 30[3] | 1.0 | — | 1.5 | 0/80/20 |
| Ex. XIV (c) | & 8.5 | 0.1 | 5 | 0.5 | 15/70/15 |

Notes:
[1] Unprotonated gel; some Rh$_2$Ac$_4$ leaches out - nevertheless activity higher than expected for this.
[2] No propanol present in this experiment
[3] 20 mg of triphenyl phosphine added.

The results of the above Table V in most cases indicate catalytic activity and product distribution values for the gel-entrapped species similar to those of the homogeneous system.

The gels were used two additional times in this procedure without diminution of catalytic activity.

EXAMPLE XVII

This example further illustrates the use of activated gels as hydrogenation catalysts.

Hydrogenation of unsaturated compounds in various solvents at 30° C was carried out at a partial pressure of hydrogen of 70 cm Hg using the catalysts prepared as described in Examples IX and XII and compared with a commercial Pd/C catalyst. The results are reproduced in the following Table VI:

TABLE VI

| Unsaturated Compound | | Solvent | | Catalyst | | wt. of metal (mg) | Initial Rate of H$_2$ comsumption (M /sec)×10$^6$ |
| --- | --- | --- | --- | --- | --- | --- | --- |
| I.D. | Quantity (ml) | I.D. | Quantity (ml) | I.D. | wt. | | |
| Acetophenone | 0.5 | n-propanol | 5.0 | 5% Pd/C | 39 | 1.9 | 80.0 |

TABLE VI-continued

| Unsaturated Compound | | Solvent | | Catalyst | | wt. of metal (mg) | Initial Rate of $H_2$ comsumption (M /sec)×10$^6$ |
|---|---|---|---|---|---|---|---|
| I.D. | Quantity (ml) | I.D. | Quantity (ml) | I.D. | wt. | | |
| Acetophenone | 0.5 | n-propanol | 5.0 | Pd gel Ex.IX | 88 | 0.44 | 0.4 |
| Octene-1 | 0.1 | n-propanol | 4.5 | Pd gel Ex.IX | 24.1 | 0.12 | 10.9 |
| Acetophenone | 0.4 | n-propanol | 4.9 | Pd gel Ex.IX | 24.1 | 0.12 | 37.7 |
| Octene-1 | 0.2 | toluene | 4.8 | Rh gel Ex.XII | 83.6 | 1.2 | 26.6 |
| Cinnamaldehyde | 0.1 | DMF | 4.9 | Pd gel Ex. IX | 55.6 | 0.28 | 15.5 |

EXAMPLE XVIII

This example illustrates the use of an activated gel for the destruction of hydrogen peroxide.

A 3% solution of $H_2O_2$ was diluted 100 fold and a 1cm diameter circular disc cut from the gel film of Example VIII was placed in the diluted solution. Almost immediately, an evolution of oxygen bubbles was observed, indicating breakdown of the hydrogen peroxide. The half-life of 10mls of the $H_2O_2$ was observed to be one hour.

The experiment was repeated using activated gel particles prepared as in Example VII and similar results were observed. For both the film and the particles, activity remained essentially undiminished during reuse and/or storage for a period of three months.

EXAMPLE XIX

This example illustrates the use of the catalyst for activated transport of oxygen through a membrane.

A deoxygenated solution of $H_2O_2$ was circulated past a 3 inch diameter gel film prepared as in Example VIII. Water containing no oxygen was circulated past the other side of the membrane and its oxygen concentration monitored by a polarographic electrode. The concentration of oxygen on the side not containing oxygen rose rapidly indicating that the peroxide decomposition inside the membrane resulted in enhancement of oxygen transport through the membrane. A control experiment with no peroxide shows only a very slow rise of oxygen concentration on the oxygen poor side of the membrane.

EXAMPLE XX

This example illustrates the elution of palladium from a colloidal dispersion in a gel.

The Pd gel of Example IX was placed in DMF, a strong swelling solvent for poly(HEMA), colloidal Pd was observed to leak out into the supernatent DMF. The activity as a hydrogenation catalyst for the gel swollen by DMF fell off rapidly with time whereas the same gel in ethanol gave a constant activity. This experiment demonstrates both the importance (for catalysis) of choosing the correct swelling solvent and the ability to generate a colloidal dispersion in a liquid using gel entrapped catalysts.

SUMMARY

The present invention, therefore, provides a novel catalyst system, methods of preparation of the unique catalysts and methods of use of the catalyst which allow ready and simple separation of the catalysts from reaction mixtures for reuse.

Modifications are possible within the scope of the invention.

What we claim is:

1. A catalyst system consisting essentially of a cross-linked pore-free amorphous polymer gel having a colloidal dispersion of catalytically-active finely-divided elemental metal particles selected from Group VIB and Group VIII metals and uniformly distributed throughout said gel, said polymer being chemically inert to said metal particles.

2. The catalyst system of claim 1 wherein said metal is selected from platinum, palladium, nickel, rhodium, ruthenium and cobalt.

3. The catalyst system of claim 1 wherein said metal particles have an average diameter of from about 50 to about 300 Angstroms.

4. A macroscopically-heterogeneous catalyst system consisting essentially of a cross-linked pore-free amorphous gel of a polymer swollen by a microscopically-homogeneous solution of a catalytically-active metal compound, said polymer being chemically inert to said metal compound and the solvent of said solution, covalent chemical bonding between the metal compound and the polymer being absent from said catalyst system.

5. The catalyst system of claim 4 wherein said metal compound is a complex of a metal selected from Group VIB and Group VIII metals.

6. The catalyst system of claim 4 wherein said metal compound is a complex of a metal selected from platinum, palladium, nickel, rhodium, ruthenium and cobalt.

7. A macroscopically-heterogeneous catalyst system consisting essentially of a cross-linked pore-free solvent-swellable amorphous gel of a polymer containing a microscopically-homogeneous solution in the gel of a catalytically-active metal compound, said polymer being chemically inert to said metal compound and the solvent of said solution, covalent chemical bonding between the metal compound and the polymer being absent from said catalyst system.

8. A method of forming a catalyst system which comprises forming a cross-linked pore-free amorphous polymeric gel swollen by a solution of a non-catalytically-active metal compound in a solvent, said metal compound being capable of activation to a catalytically-active form of the metal, said polymeric gel being chemically inert to and incapable of entering into covalent chemical bonding with said solvent, said non-catalytically-active metal compound and said catalytically-active form of the metal, and activating the metal compound to a catalytically-active form of the metal.

9. The method of claim 8 including forming said swollen gel by polymerizing at least one polymerizable monomer and at least one cross-linking copolymerizable monomer to form a cross-linked pore-free amorphous polymeric gel, and contacting the gel with a solution of said non-catalytically-active metal compound in said solvent to absorb said solution into said gel.

10. The method of claim 9 including removing said solvent from the gel prior to said activation.

11. The method of claim 9 including removing said solvent from the gel after said activation.

12. The method of claim 9 including using about 0.1 to about 5 percent cross-linking monomer(s) based on the weight of said at least one polymerizable monomer.

13. The method of claim 8 including forming said swollen gel by polymerizaing to an amorphous, pore-free, polymeric gel at least one polymeriable monomer and at least one cross-linking copolymerizable monomer in the presence of a solution of said non-catalytically-active metal compound in said solvent.

14. The method of claim 13 including removing said solvent from the gel prior to said activation.

15. The method of claim 13 including removing said solvent from the gel after said activation.

16. The method of claim 13 including using about 0.1 to about 5 percent cross-linking monomer(s) based on the weight of said at least one polymerizable monomer.

* * * * *